United States Patent [19]

Gilliland

[11] Patent Number: 4,815,242
[45] Date of Patent: Mar. 28, 1989

[54] MODULAR LEAN-TO POST AND BEAM STRUCTURE

[75] Inventor: Terry L. Gilliland, San Leandro, Calif.

[73] Assignee: Four Seasons Solar Products Corporation, Holbrook, N.Y.

[21] Appl. No.: 929,271

[22] Filed: Nov. 12, 1986

[51] Int. Cl.$^4$ .............................................. E04B 7/02
[52] U.S. Cl. .......................................... 52/90; 5/66; 5/79.5; 403/381; 403/295; 403/316
[58] Field of Search ................... 52/90, 92, 64, 66, 69, 52/72, 79.5, 639, 640, 93, 642, 645; 403/295, 381, 316, 354

[56] References Cited

U.S. PATENT DOCUMENTS

| | | | |
|---|---|---|---|
| 2,883,712 | 4/1959 | Shelamer | 52/92 X |
| 2,994,888 | 8/1961 | Minuti | 403/407.5 X |
| 3,206,903 | 9/1965 | Johnson | 52/92 |
| 3,284,966 | 11/1966 | Bolt | 52/79.5 |
| 3,434,253 | 3/1969 | Hatcher | 52/69 |
| 3,550,335 | 12/1970 | Huffman | 52/90 X |
| 3,749,428 | 7/1973 | Hustead | 52/90 X |
| 3,849,012 | 11/1974 | Krouse | 52/90 |
| 4,057,941 | 11/1977 | Schwartz | 52/92 X |
| 4,285,176 | 8/1981 | Runkle | 52/648 X |
| 4,462,390 | 7/1984 | Holdridge et al. | 52/82 X |
| 4,610,563 | 9/1986 | Ostergaard | 403/381 |
| 4,671,027 | 6/1987 | Esposito | 52/90 X |

FOREIGN PATENT DOCUMENTS

| | | | |
|---|---|---|---|
| 355228 | 8/1905 | France | 52/639 |
| 1010573 | 3/1952 | France | 403/231 |
| 25707 | 7/1963 | German Democratic Rep. | |
| 62644 | 5/1926 | Sweden | |
| 425010 | 3/1935 | United Kingdom | |

*Primary Examiner*—J. Karl Bell

[57] ABSTRACT

A prefabricated post and beam lean-to or free standing structure, incorporating a self-aligning, load bearing mortise and tenon joint assembly which results in a mitred joint with no visible hardware when fabricated. The structure is formed from a plurality of post and beams arranged in spaced, parallel, vertical and inclined. Attitudes extending from a lower support surface at the base of the post, with the inclined beams attaching at a higher support surface. The prefabricated sloping mortise in the post allows the beam's prefabricated tenons to be modified, on site, to descend further into the sloping mortise channel enabling the slope to be adjusted. This frame system then supports single or double glass or other sheets of material for lateral support over the enclosure. The horizontal spacing between the posts and beams is achieved by using prefabricated and sized muntins, purlins and eave header components which are fitted with fastening hardware that rigidly connects the multiple posts and beams into a structural frame.

11 Claims, 4 Drawing Sheets

MODULAR LEAN-TO POST AND BEAM STRUCTURE

FIELD OF INVENTION

This invention relates to a modular post and beam lean-to framing system of the type which includes glazed or solid sheets, and can be modified to accommodate various angles by altering the beam's tenons. By replacing a fixed wall as the higher support surface with a fixed ridge, a symetrical free standing structure may be created from two back to back lean-to units.

BACKGROUND OF THE INVENTION

A mortised and tenoned post and beam framing structure is known of the type which includes vertical posts and sloped beams that usually form a plurality of posts and beams extending in parallel spaced relationship with respect to one another, with purlins extending laterally across the beams and posts with glass panes or other sheets of material extending between the beams and purlins. The beams support their own weight in addition to the weight of horizontal purlins, sheets of material and any external loads placed on the structure such as wind forces, rain, snow, ice, etc. The posts and beams are assembled on site, enabling them to be efficiently mass produced as independent components, and to be handled, stored and erected by relatively unskilled labor.

The usual load bearing connectors, for attaching the posts to the foundation or basewall, are anchor clips which fasten to the bottom of the posts and are then connected rigidly to the supporting surface. Similarly, the inclining beams have fixed or pivoting anchor clips fastened to the ends and underside of the beams and the clips are then fastened rigidly to a higher support surface. The use of pre-sized purlins, muntins and eave headers between the post and beam assemblies determines the horizontal spacing relationships and increases the speed with which the frame can be erected.

PRIOR ART

The original use of mortise and tenon joints in post and beam framing dates back to the 18th and 19th centuries in this country. These posts and beam structures were hand hewn from heavy timbers and did not lend themselves to mass produced prefabricated components.

Most recently there has been developed various means to prefabricate these post and beam structures. One such method involves using common mortises which are referred to as joist notches, that the beams ends are seated into. After seating the beams into the joist notches, they are structurally fastened by the use of sheet metal spiked plates which are common in the truss industry. Another means for assembling posts and beams is the common practice of seat cutting the bottom of the beam with an angle that corresponds with the desired slope and fastening the seat on the beam to the top of the square cut post. This same seat cut can further enhance the post and beam alignment by modifying it to include a cut out notch commonly referred to as a bird's mouth that allows the post to reference to the 90 degree angle that the bird's mouth creates in the bottom of the beam's seat cut. Another common means to structurally connect the post and beam involves the use of a laminated spline. The post and beam are mitred at the end of each part to achieve the desired slope when they are assembled. These same mitred ends are notched in their middle to receive a triangular spline which is then laminated into the post and beam, creating a permanent structural connection.

These aforementioned post and beam structures have the following limitations, the mortise and tenoned joint, as defined, does not address the structural requirements of inclined beams. Its application relates to vertical wall fabrication. The standard seat cut on the beam has no alignment capabilities, and the post and beam alignment is totally dependent on the erector. The seat cut with the bird's mouth, has the enhanced alignment of the post into the beam's 90 degree angle corner, but has no lateral alignment as a consequence of how the post and beam assemble. Its alignment is also dependent on the erector. The laminated spline moreover has the following deficiencies. The joint is typically pre-assembled in the factor which requires that the post and beams be routed, sanded and shipped pre-assembled. Moreover, pre-assembled units are not time or cost effective to produce, handle, store or ship. The proposed post and beam fabrication methods enable the erector to easily adjust, if necessary, the slope of the pre-fabricated components on the building site. In addition none of the other methods of post and beam assemblies have been designed in conjunction with specialized attachment means such as the pivoting beam hardware for connecting the beams to the higher support surface.

SUMMARY OF THE INVENTION

It is an object of the object of the invention to provide an improved means of prefabricating and erecting modular post and beam lean-to enclosures which are expandible in length, width and height. The framing system is characterized by the limited number of required components, and the ability of these components to be interchangeable between structures of diverse exterior size and shape. Another object of the invention is to provide a post and beam framing system which has been specially designed to enhance the ability to mass produce prefabricated components which can be transported to the building site as a package to be erected by semi-skilled labor on a previously prepared basewall or foundation.

A further object of this invention is to easily accommodate numerous types of doors, windows, glass panes, aluminum extrusions and other sheets which, when attached to the modular post and beam frames' sidewalls, endwalls and roof in a sealed relationship, form a water tight and insulated structure. Another object of this invention is to provide mitred mortise and tenon joint assembly whose alignment and load bearing qualities are a result of the vector forces which cause the vertical load on the beams' mitred tenon surfaces to align with, and to be guided by the posts' corresponding mitred mortise surfaces. As a result of this alignment, the beams' tenon descends into, and registers against the post's mortised channel that contains the fulcrum point which the beam is then rigidly fastened to. Still another object of the invention is to give the semi-skilled laborer who assembles the post and beam on site the ability to easily align the sides of the post and beam laterally. This is accomplished by dimensioning the tenon smaller than the corresponding mortise, and by drilling the fasteners dimension to allow movement. Yet another object of the invention is to prefabricate the mortise depth in the post to the maximum slope elevation, with the mitred surfaces cut to accommodate the minimum slope which has been milled on the beams' mitred tenon surfaces. This enables the beams mitred tenon surfaces to be cut on site to increase the angle of the beams' slope, thus enabling the beams' slope to be adjusted to the desired slope on site. An additional object of this invention allows the standardized post to readily accept deeper beams than the depth of the post. For example, a 4×4 post with a standardized mortise will readily accept a 4×6 or 4×8 beam, but this ability is not limited to these dimensional sizes.

Another object of this invention is to produce a finished frame structure that achieves the maximum aesthetic eye-appeal by its use of furniture quality joinery, which when assembled produces an eye pleasing mitre and has no visible hardware exposed to the interior of the structure.

Another object of this invention includes the use of prefabricated purlins, muntins and eave headers which, when used in conjunction with the post and beam assemblies, provide a means to predetermine the horizontal spatial relationship of the post and beams. This greatly decreases the required time to align and erect the structure.

Ease and speed of assembly is further aided by use of a concealed fastening apparatus is applied to a structural framing structure by setting fasteners into the ends of the purlins and eave headers which then allow these components to be rapidly assembled and assures concise positioning due to these components having been prefabricated to accommodate the fasteners and the corresponding screws which rigidly connect the parts.

Yet another object of this invention is to provide a method of installing a post and beam framing structure wherein more standardized parts can be used and wherein the framing structure expediently and inexpensively erected using semi-skilled labor. Other objects, features and advantages of the present invention will become apparent from reading the following specification, when taken in conjunction with the accompanying drawings.

DESCRIPTION OF THE PREFERRED EMBODIMENT

The envisioned application is a lean-to structure that uses the wall (10) of a residence or other stable structure as one of its four sides.

Figure 1:
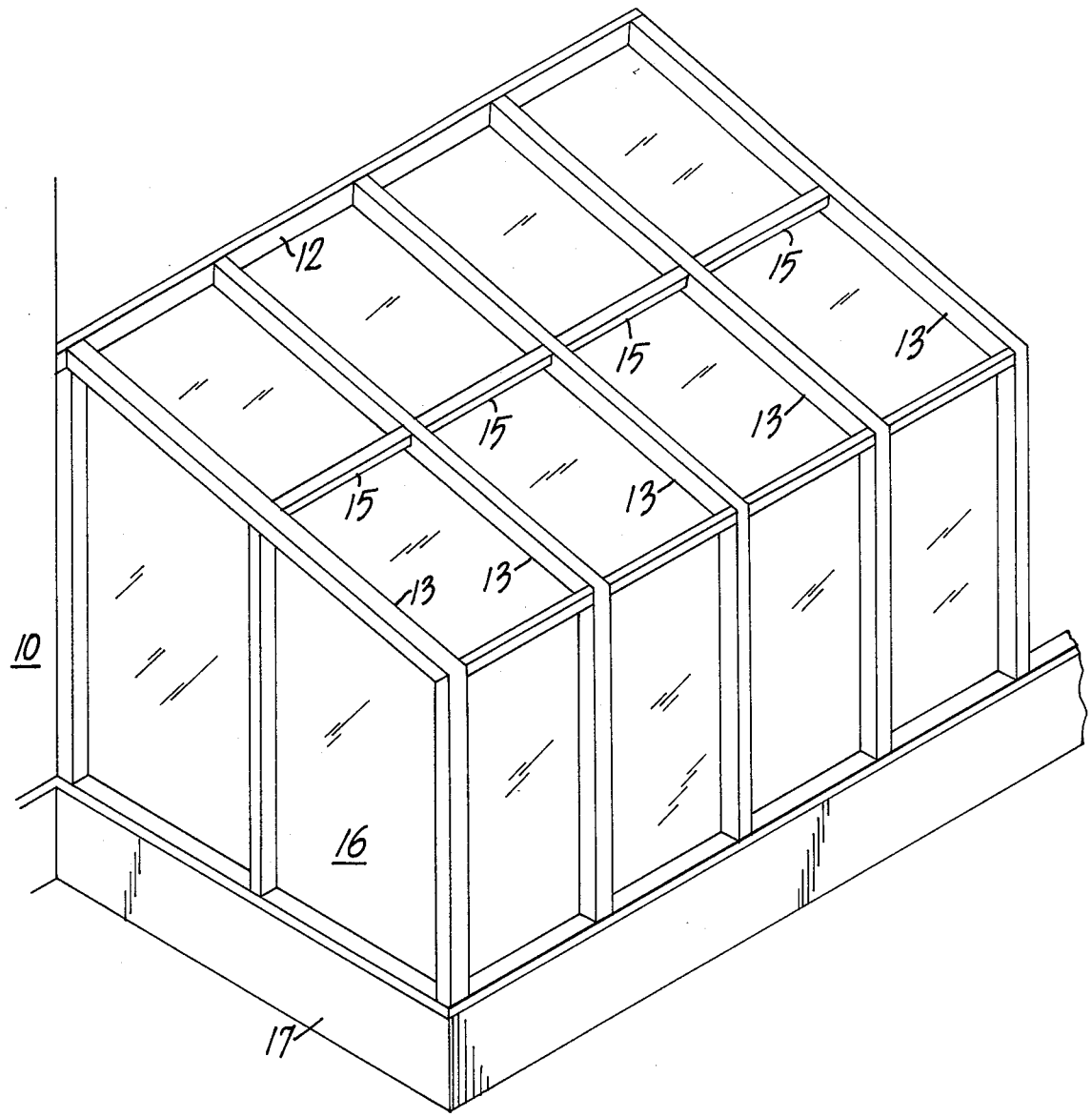
FIG. 1 is a perspective drawing of a lean-to structure connected to a building.
Figure 2:
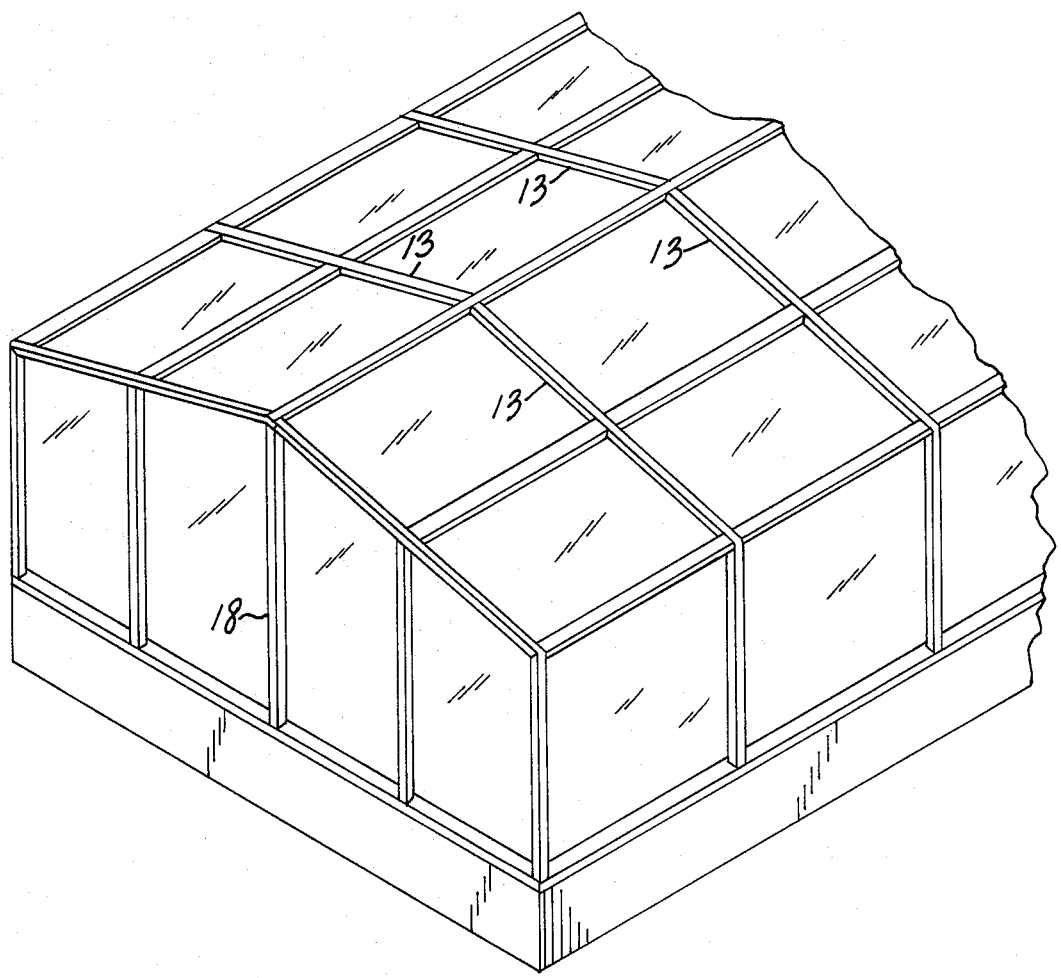
FIG. 2 is a perspective drawing showing a free standing structure made from two lean-to structures "back to back"
Figure 3:
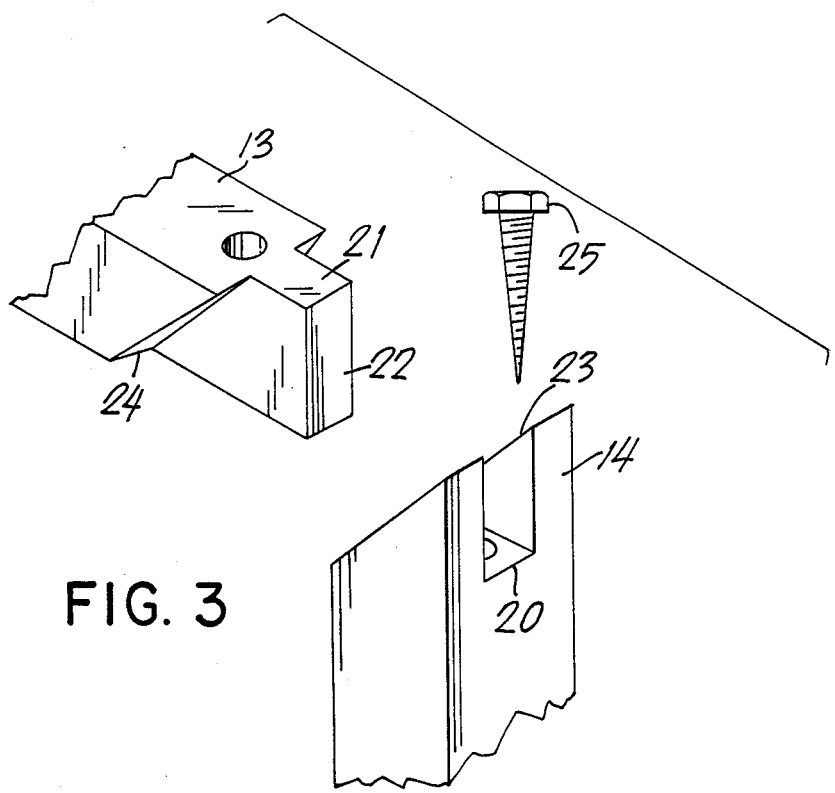
FIG. 3 is a exploded view of a mortise and tenon joint connecting a typical post with a typical beam in accordance with the invention.

Header (11) is secured to wall (10) by bolts (12). Horizontally sloped beams (13) are attached to ridge beam (11) by fixed or adjustable means as shown, in FIG. 4. Rafters are attached to posts (14) in a unique manner as shown in FIG. 3. Cross purlins (15) are attached to beams (13) and posts (14) by concealed or other means described in reference to FIG. 6. The lean-to structure is supported on its perimeter by a footing (16). FIG. 2 shows free standing adaptation of the lean-to structure.

Instead of wall (10), supporting the ridge beam (11) can be rigidly attached to two or more vertical posts (18) for vertical load support. FIG. 3 is an exploded view of the mortise and tenon joint that provides the unique connection between the posts (14) and beams (13). Slot seat (20) is beveled at the same slope as the beam (13) to receive tongue (21) which has a width narrower than slot seat (20). Tongue (21) has its front beveled surface (22) angled so that, once seated, its front beveled surface (22) is flush with the face of the post (14) or may extend beyond the post (14). Secondary support surface (23) is beveled at an angle to match the angle beveled in the shoulder (24) so that the two faces meet flush. Once the tongue (21) is securely resting flush on seat (20), bolt (25) is then used to secure beam (13) to post (14).

Figure 4:
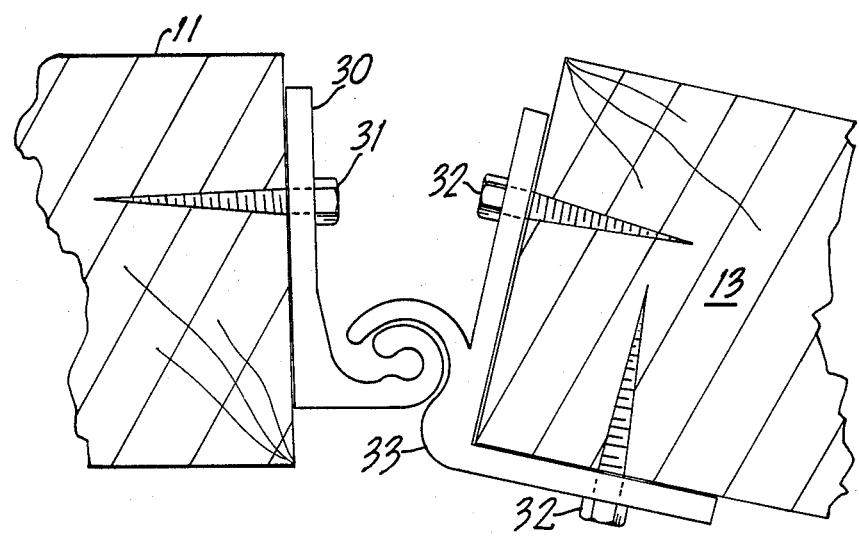
FIG. 4 is a side view of an adjustable higher support surface.
Figure 5:
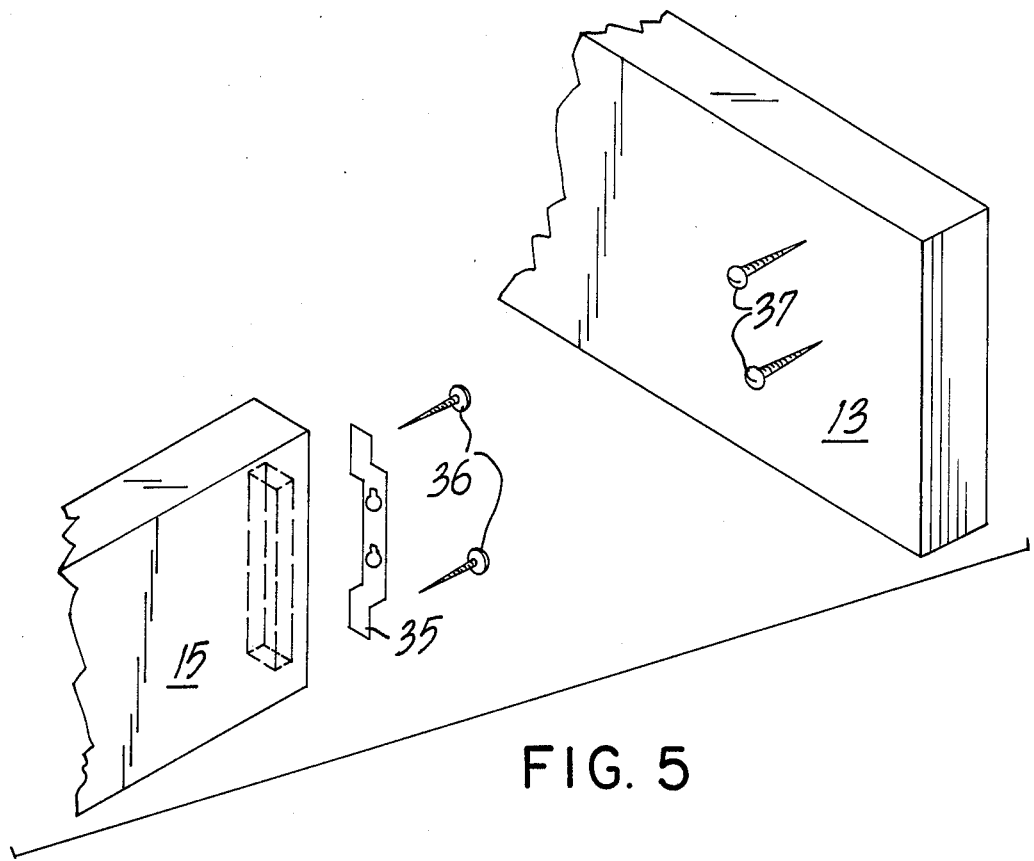
FIG. 5 is an exploded view of the concealed attachment of the purlins to the posts and beams.

Attention is directed to FIG. 4 showing a means for attaching the beam (13) to ridge beam (11). The ridge clip (30) is secured to the ridge beam (11) by fastener (31). Beam socket (33) is secured to the horizontally sloped beam by fasteners (32). FIG. 5 shows a typical method of attaching the purlins (15) to the posts (14) and beams (13). Support clip (35) is inset into a pocket made in the end of purlin (15) with fasteners (36) so that the support clip (35) is inset below the end of the purlin (15). Screws (37) are inserted into beam (13) so that when the screws (37) set into support clip (35) the top edge of the purlin (15) is flush with the top edge of the beam (15). In the case of a purlin on a vertical surface, it is flush with the post (14).

Figure 6:
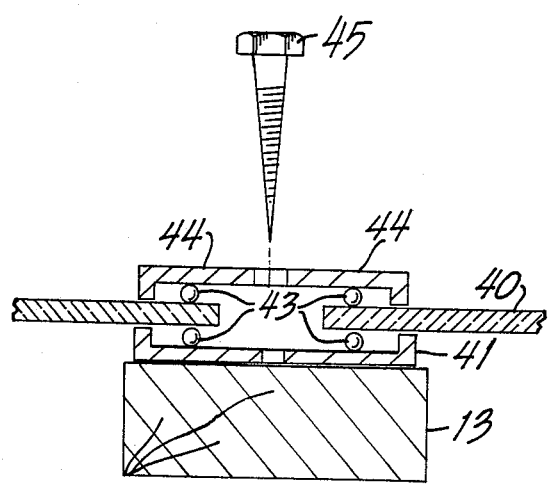
FIG. 6 is a typical section of the method of joining the material with the structure frame.

FIG. 6 shows the attachment of a typical infill surface (40) to the structure beam (13), and in similar fashion to vertical posts (14). In this application, member 40 is single pane glass. The glazing seat (41) is supported by beam (13). The glazing (40) rests on continuous seals (43) at the bottom and glazing cap (44) is placed over the glazing (40) and secured by fastener (45).

What is claimed is:
1. A lean-to structure comprising:
   (a) a plurality of vertical posts, each of said posts including a bottom end and a top end, said top end including a sloped-seat having a width which is less that the width of the associated post thus leaving a remainder of width as a balance, said top end including vertical extension means, including at least one vertical extension, and being equal in width to said remainder of width of the associated post and extending above the seat with the vertical extension means having a top which is sloped at an angle relative to the associated post and to the seat thereof;
   (b) a plurality of horizontally inclined beams each being associated with one of said posts and including a higher end and a lower end and further including a means of support at the higher end thereof and at the lower end a tongue and at least one sloped shoulder extending laterally of the tongue, the tongue resting flush on the sloped seat of the associated post along a plane extending across the associated vertical post and the shoulder resting on the sloped top of the vertical extension means of the associated post;

(c) means penetrating through the lower ends of the horizontal beams and into the sloped seats in the vertical post thereby fastening the beams to the posts;

(d) a plurality of panels; and (e) means for affixing the panels to the posts and beams thereby creating a surface for the structure.

2. A structure as claimed in claim 1 wherein the means of support at the higher end of the beams includes a pivoting bracket.

3. A structure as claimed in claim 1 comprising purlins and means for attaching the purlins to the posts and beams, said means for attaching including a concealed bracket affixed in recesses provided at the ends of the purlins.

4. A lean-to structure as claimed in claim 1 wherein the panels are glass sheets.

5. A lean-to structure as claimed in claim 1 wherein the shoulders and the tops of the vertical extension means, on the one hand, and the seats, on the other hand, slope in opposite directions.

6. A lean-to structure as claimed in claim 1 wherein each vertical extension means includes two vertical extensions straddling the associated seat.

7. A lean-to structure as claimed in claim 1 wherein each seat extends completely across the associated vertical post.

8. A lean-to structure as claimed in claim 1 wherein each shoulder extends completely across the associated vertical post.

9. A lean-to structure as claimed in claim 5 wherein each vertical extension means extends completely across the associated vertical post.

10. A lean-to structure as claimed in claim 9 wherein each seat extends completely across the associated vertical post and each tongue extends at least completely across the associated vertical post and wherein each seat slopes downwardly away from the higher end of the associated horizontal beam.

11. A lean-to structure as claimed in claim 5 wherein the shoulders and tops of the vertical extension means abut along a flat plane.

* * * * *